United States Patent [19]

Moronaga et al.

[11] Patent Number: 5,229,864
[45] Date of Patent: Jul. 20, 1993

[54] DEVICE FOR REGENERATING A PICTURE SIGNAL BY DECODING

[75] Inventors: Kenji Moronaga; Mikio Watanabe; Kaname Nihei, all of Tokyo, Japan

[73] Assignee: Fuji Photo Film Co., Ltd., Kanagawa, Japan

[21] Appl. No.: 682,244

[22] Filed: Apr. 9, 1991

[30] Foreign Application Priority Data

Apr. 16, 1990 [JP] Japan ................................. 2-97639
Apr. 18, 1990 [JP] Japan ................................ 2-100413
Apr. 19, 1990 [JP] Japan ................................ 2-101739

[51] Int. Cl.$^5$ ............................................. H04N 1/40
[52] U.S. Cl. ................................... 358/433; 358/426; 358/432
[58] Field of Search ............... 358/432, 433, 427, 426, 358/133, 135, 136, 448; 382/56

[56] References Cited

U.S. PATENT DOCUMENTS

| | | | |
|---|---|---|---|
| 4,774,587 | 9/1988 | Schmitt | 358/426 |
| 5,051,840 | 9/1991 | Watanabe et al. | 358/433 |
| 5,101,280 | 3/1992 | Moronaga et al. | 358/426 |

Primary Examiner—Edward L. Coles, Sr.
Assistant Examiner—Grant, II: Jerome

[57] ABSTRACT

A device for decoding digital picture data coded by compression to thereby regenerate original picture data has a decoding section for decoding the digital picture data. A reverse normalizing section reversely normalizes picture data outputted by the decoding section. A reverse orthogonal transforming section executes two-dimensional reverse orthogonal transform with picture data outputted by the reverse normalizing section. A data counting section counts coded data existing in a plurality of blocks constituting the digital picture data block by block. A filter selecting section selects an interblock filter and an edge filter on the basis of the amount of coded data determined by the data counting section block by block. A correcting section corrects a distortion between nearby blocks by using the interblock filter selected, while an edge enhancing section executes edge enhancement by using the edge filter. The filter selecting section selects the intensity of the interblock filter and the intensity of the edge filter on the basis of the amount of coded data determined block by block. The filters for the correction of a distortion may be replaced with predicted values which are determined on the basis of the activities of individual blocks and substituted for pixel data. Random noise matching the activities of individual blocks may be added to pixel data after the correction in order to eliminate the distortion of contours of the blocks.

12 Claims, 10 Drawing Sheets

| K0 | K1 | K2 | K3 |

Fig. 6

| E0 | E1 | E2 | E3 | E4 |

|     |     |     |     |     |     |     |     |     |     |     |     |     |     |     |     |
|-----|-----|-----|-----|-----|-----|-----|-----|-----|-----|-----|-----|-----|-----|-----|-----|
| A00 | A10 |     |     |     |     |     |     | B00 | B10 |     |     |     |     |     |     |
| A01 |     |     |     |     |     |     |     | B01 | B11 |     |     |     |     |     |     |
|     |     |     |     |     |     |     |     |     |     |     |     |     |     |     |     |
|     |     |     |     |     | A53 | A63 | A73 | B03 | B13 |     |     |     |     |     |     |
|     |     |     |     |     |     |     |     |     |     |     |     |     |     |     |     |
|     | A15 | A25 | A35 | A45 | A55 |     |     |     |     |     |     |     |     |     |     |
|     |     | A36 |     |     |     |     |     |     |     |     |     |     |     |     |     |
|     |     | A37 |     |     | A77 |     |     |     |     |     |     |     |     |     | B77 |
| C00 | C10 |     | C30 |     |     |     |     |     |     |     |     |     |     |     |     |
| C01 |     |     | C31 |     |     |     |     |     |     |     |     |     |     |     |     |
|     |     |     |     |     |     |     |     |     |     |     |     |     |     |     |     |
|     |     |     |     |     |     |     |     |     |     |     |     |     |     |     |     |
|     |     |     |     |     |     |     |     |     |     |     |     |     |     |     |     |
|     |     |     |     |     |     |     |     |     |     |     |     |     |     |     |     |
|     |     |     |     |     |     |     |     |     |     |     |     |     |     |     |     |
|     |     |     |     |     |     |     | C77 |     |     |     |     |     |     |     |     |

DEVICE FOR REGENERATING A PICTURE SIGNAL BY DECODING

BACKGROUND OF THE INVENTION

1. Field of the Invention

The present invention relates to a device for regenerating a picture signal by decoding it and, more particularly, to a device for regenerating digital picture data coded by compression and transmitted or stored by decoding while reducing distortions between nearby blocks which constitute the picture data.

2. Description of the Related Art

Generally, when picture data generated by an electronic still camera or similar digital picture data is stored in a memory or transmitted to a remote station, it is a common practice to code the picture data by compression for the purpose of reducing the amount of data. Among various conventional compression schemes, two-dimensional orthogonal transform is extensively used since it compresses picture data by a large ratio and causes a minimum of distortion ascribable to coding to occur in a picture.

The two-dimensional orthogonal transform type coding divides picture data into a predetermined number of blocks and transforms the picture data block by block. The transformed picture data have transform coefficients thereof compared with a predetermined threshold value, and the coefficients smaller than the threshold value are discarded. The transform coefficients greater than the threshold value are each divided by a particular quantizing step value, i.e., normalizing coefficient and thereby quantized or normalized by the step width. The normalized transform coefficients are coded by Huffman coding to produce compressed picture data. The compressed picture data is written to a memory or transmitted to a remote station.

To regenerate original picture data, the picture data compressed by the above procedure is decoded by Huffman decoding and then subjected to reverse normalization and reverse orthogonal transform. The problem with this kind of compressed picture data is that since the picture data has been divided into blocks and then subjected to orthogonal transform and coding block by block, the decoded picture data has distortions between nearby blocks, i.e. interblock distortions. Especially, the border or edge between nearby blocks is conspicuous in relatively monotonous portions of a picture, which lowers the quality of a reproduced image.

SUMMARY OF THE INVENTION

It is therefore an object of the present invention to provide a device which regenerates picture data adequately by reducing distortions between nearby blocks of compressed picture data.

In accordance with the present invention, a device for regenerating a picture signal by decoding the picture signal has a decoding section for decoding digital picture data coded by compression, reverse normalizing means for reversely normalizing picture data decoded by the decoding section, a reverse orthogonal transforming section for executing two-dimensional reverse orthogonal transform with picture data outputted by the reverse normalizing section, a data counting section for counting coded data existing in a plurality of blocks constituting the digital picture data block by block, a filter selecting section for selecting an interblock filter and an edge filter on the basis of the amount of coded data determined by the data counting section block by block, a correcting section for executing correction processing for correcting a distortion between nearby blocks by using the interblock filter selected by the filter selecting section, and edge enhancing section for executing edge enhancement processing by using the edge filter selected by the filter selecting section. The filter selecting section selects the intensity of the interblock filter and the intensity of the edge filter on the basis of the amount of coded data determined block by block.

Also, in accordance with the present invention, a device for regenerating a picture signal by decoding the picture signal has a decoding section for decoding digital picture data coded by compression, a reverse normalizing section for reversely normalizing picture data decoded by the decoding section, a reverse orthogonal transforming section for executing two-dimensional reverse orthogonal transform with picture data outputted by the reverse normalizing section, an activity calculating section for calculating the activities of a plurality of blocks constituting the digital picture data block by block, a predicted value calculating section for calculating predicted pixel data to be substituted for pixel data located at the boarder between nearby blocks, and a distortion correcting section for executing correction processing for correcting a distortion between nearby blocks by using the predicted pixel data determined by the predicted value calculating section. The distortion correcting section executes the correction processing based on the predicted pixel data in matching relation to the activity which is determined block by block.

Further, in accordance with the present invention, a device for regenerating a picture signal by decoding the picture signal has a decoding section for decoding digital picture data coded by compression, reverse normalizing means for reversely normalizing picture data decoded by the decoding section, reverse orthogonal transforming means for executing two-dimensional reverse orthogonal transform with picture data outputted by the reverse normalizing section, an activity calculating section for calculating the activities of a plurality of blocks constituting the digital picture data block by block, a random noise generating section for generating random noise, and random noise adding means for adding the random noise generated by the random noise generating section to pixel data outputted by the reverse orthogonal transforming section. The random noise adding section adds the random noise in matching relation to the activity determined block by block.

BRIEF DESCRIPTION OF THE DRAWINGS

The objects, and features of the present invention will become more apparent from the consideration of the following detailed description taken in conjunction with the accompanying drawings in which.

DESCRIPTION OF THE PREFERRED EMBODIMENTS

Figure 1:
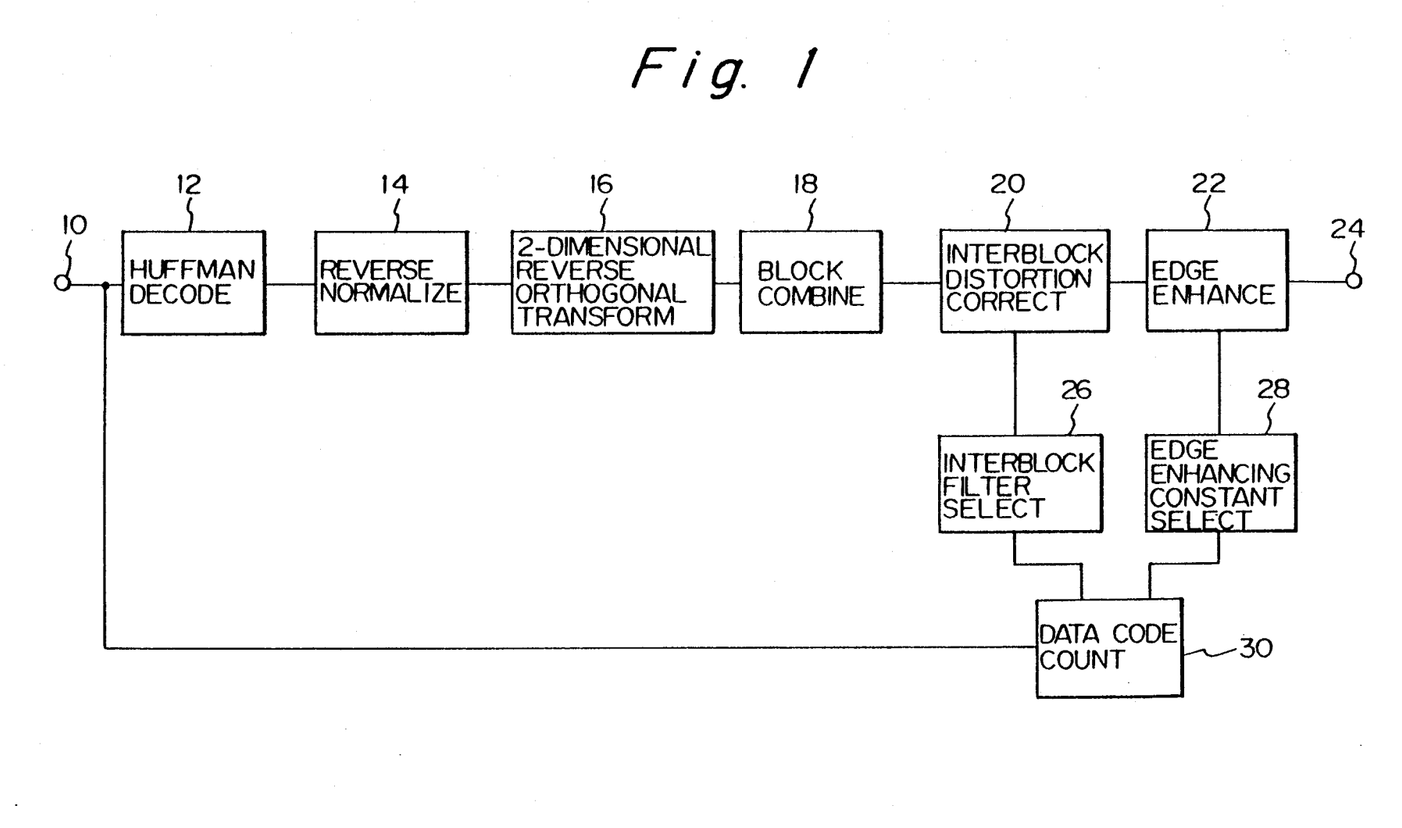
FIG. 1 is a block diagram schematically showing an image signal regenerating device embodying the present invention.

Referring to FIG. 1 of the drawings, a device for decoding and thereby regenerating a picture signal embodying the present invention is shown. The device is of the type which receives picture data coded by compression and decodes the coded picture data to produce original picture data. The compressed picture data which the illustrative embodiment deals with may be produced by a conventional coding device shown in FIG. 2.

Figure 2:
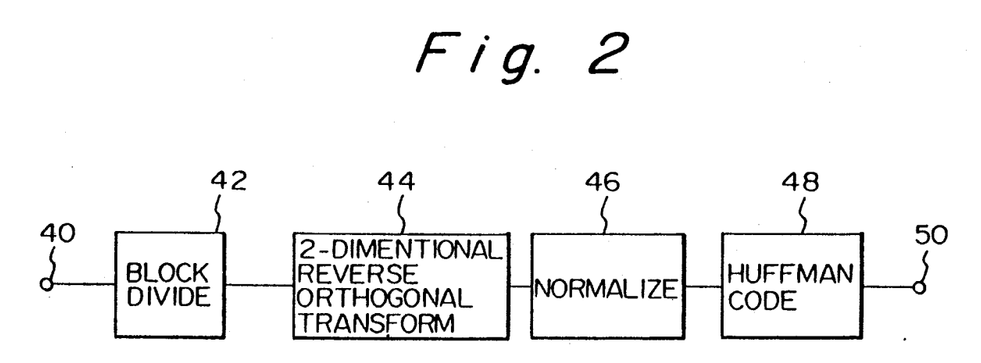
FIG. 2 is a block diagram schematically showing a specific construction of a conventional device for compressing a picture signal.
Figure 7:
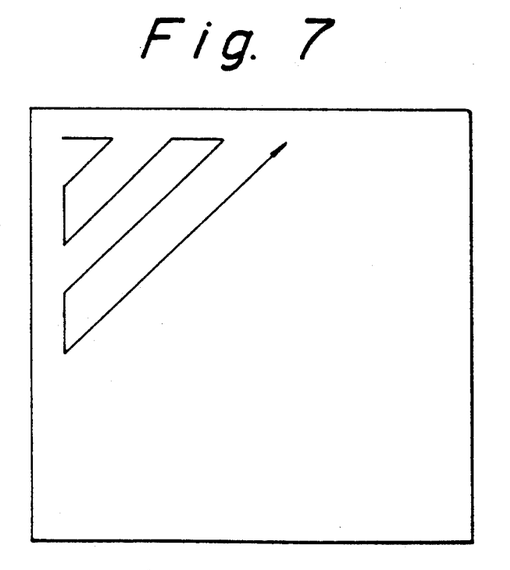
FIG. 7 shows a Huffman coding sequence particular to the first embodiment.

In FIG. 2, the coding device has an input terminal 40 to which digital picture data are applied. A dividing section 42 divides the input picture data into a plurality of blocks each having 8×8 pixels. A two-dimensional orthogonal transform section 44 compresses the divided picture data by executing two-dimensional orthogonal transform with each of the blocks. A normalizing section 46 normalizes the individual picture data by dividing the transform coefficients thereof by normalizing coefficients. A Huffman coding section 48 codes the normalized data to produce Huffman codes. Specifically, as shown in FIG. 7, the normalized data are scanned 14a zig-zag direction and a block by block manner and fed to the Huffman coding section 48. Considering the fact that zero often appears continuously in normalized transform coefficients, the Huffman coding section 48 determines the amount in which data whose value is zero appears continuously, i.e., run-lengths of zeros and the amplitudes of non-zeros, and transforms them to Huffman codes. The picture data, which has undergone two-dimensional Huffman coding are fed out via an output terminal 50 to a transmission channel or a memory.

Figure 3:
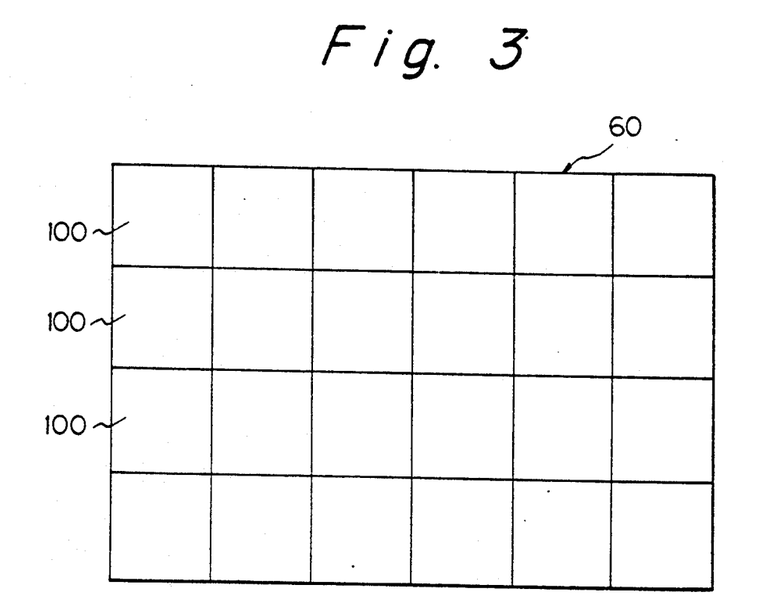
FIG. 3 shows blocks of image data which are combined by the first embodiment.

The picture data compressed as described above are applied to and decoded by the regenerating device shown in FIG. 1. The regenerating device has a Huffman decoding section 12 for Huffman-decoding the compressed picture data coming in through the input terminal 10. The Huffman-decoded picture data are fed from the Huffman decoding section 12 to a reverse normalizing section 14. In response, the reverse normalizing section 14 reversely normalizes the input picture data, i.e., multiplies the decoded data by the normalizing coefficients which the coding device of FIG. 2 has used. A two-dimensional reverse orthogonal transform section 16 executes two-dimensional reverse orthogonal transform with each block of the picture data fed thereto from the reverse normalizing section 14, for thereby restoring each block to 8×8 pixel data. The data from the reverse orthogonal transform section 16 are transferred to a combining section 18. As shown in FIG. 3, the combining section 18 reproduces original picture data 60 by combining a plurality of blocks 100.

The composite picture data outputted by the combining section 18 are delivered to an interblock distortion correcting section 20. The interblock distortion correcting section 20 corrects a distortion between nearby blocks of regenerated picture data, i.e., interblock distortion by using a particular interblock filter which will be described below. Receiving an output of this correcting section 20, an edge enhancing section 22 eliminates the blur of the picture caused by the interblock filter by using a particular edge filter which will also be described later.

Figure 4:
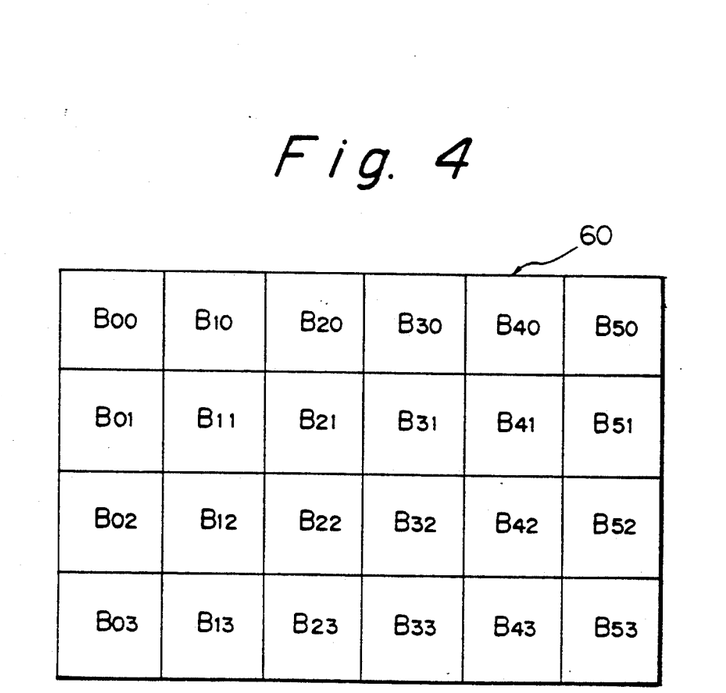
FIG. 4 shows the amounts of codes existing in the individual blocks of picture data.

The compressed picture data which arrives at the input terminal 10 are also fed to a data code counting section 30. The data code counting section 30 counts codes of the input picture data block by block. Specifically, as shown in FIG. 4, the data code counting section 30 determines the amount of coded data Bxy of the compressed picture data block by block. In FIG. 4, "B00", "B10", "B20" and so on are representative of the amounts of coded data Bxy of the individual blocks each having an 8×8 pixel matrix. For example, the amount of coded data Bxy is great in the blocks having high activities, i.e., many high frequency components, and the amount of coded data Bxy is small in the blocks having low activities, i.e., many low frequency components. The block-by-block amounts of coded data Bxy so determined by the counting section 30 are transferred to an interblock filter selecting section 26 and an edge enhancement constant selecting section 28.

Figure 5:
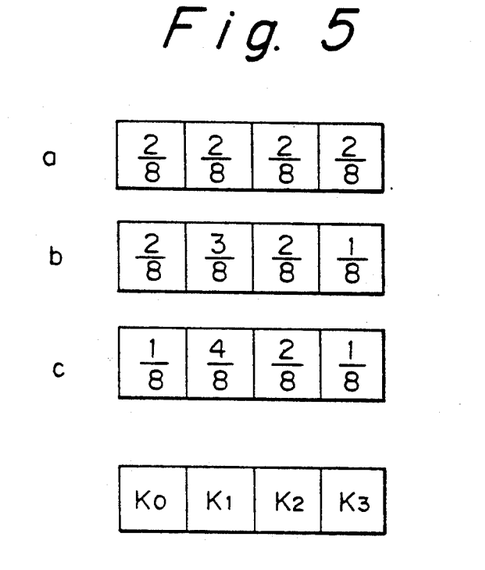
FIG. 5 shows interblock filters with which the first embodiment is practicable.

The interblock filter selecting section 26 selects a particular interblock filter which the interblock distortion correcting section 20 should use in matching relation to the amount of coded data Bxy of a block of interest fed from the data code counting section 30. The interblock filter is implemented as a low pass filter. In the illustrative embodiment, the interblock filter receives four pixel data at a time and passes only low-frequency components, as shown in FIG. 5. Specifically, data of two pixels for one of two nearby blocks and data of two pixels for the other block, which adjoins the former two pixels at the border between the two blocks, are fed to the interblock filter selecting section 26 at a time. In response, the interblock filter filters the four data portions to eliminate or reduce a distortion between the nearby blocks, i.e., an edge appearing at the border between the blocks.

Figure 8:
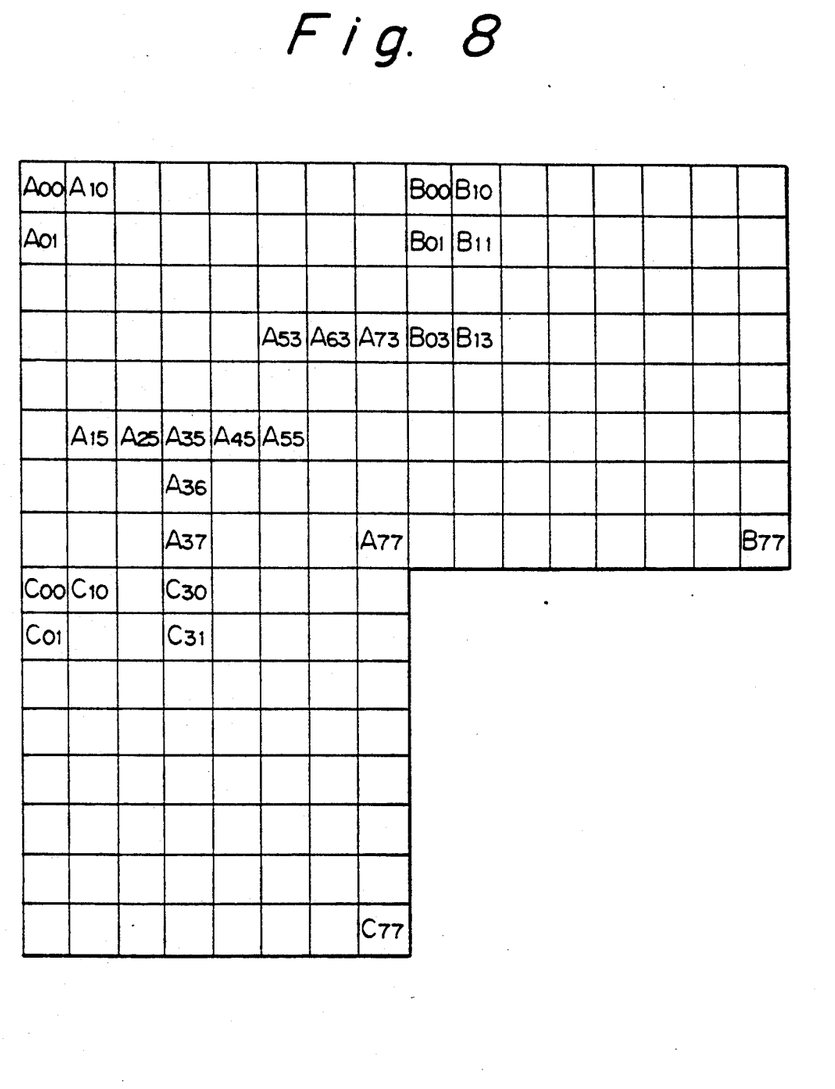
FIG. 8 shows specific pixel data existing in nearby blocks to be processed by the first embodiment.

As shown in FIG. 5, in this embodiment, the interblock filter selecting section 26 selects one of three different interblock filters a, b and c. Each of the interblock filters a, b and c has coefficients K0, K1, K2 and K3 being assigned to the respective one of the four pixel data adjoining at the border between two nearby blocks, as shown at the bottom of FIG. 5. Assuming that the interblock distortion correcting section 20 processes a particular pixel A73 shown in FIG. 8 by using such an interblock filter, the correcting section 20 then substitutes for the pixel A73 pixel data A73 which is produced by:

$$A73 = K0 \cdot A63 + K1 \cdot A73 + K2 \cdot B03 + K3 \cdot B13.$$

Likewise, to process the pixel B03 shown in FIG. 8, the correcting section 20 substitutes for the pixel B03 pixel data B03 produced by:

$$B03 = K3 \cdot A63 + K2 \cdot A73 + K1 \cdot B03 + K0 \cdot B13.$$

When an interblock filter is applied to a pixel A37, which is located at the border between two blocks neighboring each other in the vertical direction as shown in FIG. 8 the pixel A37 is replaced with pixel data A37 which is produced by:

$$A37 = K0 \cdot A36 + K1 \cdot A37 + K2 \cdot C30 + K3 \cdot C31.$$

Likewise, to process a pixel C30 by an interblock filter, the pixel C30 is replaced with pixel data C30 which is expressed as:

$$C30 = K3 \cdot A36 + K2 \cdot A37 + K1 \cdot C30 + K0 \cdot C31.$$

The interblock filters a, b and c of FIG. 5, selectively used to process pixel data as stated above have a relation of a>b>c with respect to filtering intensity. Specifically, the interblock filter a removes an interblock distortion more intensely than the other filters b and c so as to provide a pixel of interest located at the border with a value which is a mean value of that pixel and the pixels adjoining that pixel.

The interblock filter selecting section 26 compares a given amount of coded data Bxy with predetermined threshold values TH3 and TH4 (TH3<TH4) and selects one of the interblock filters a, b and c on the basis of the result of the comparison. Specifically, when the amount of coded data Bxy is smaller than the threshold value TH3, the selecting section 26 selects the most intense interblock filter a. When the amount of coded data Bxy is equal to or greater than the threshold value TH3 and smaller than the threshold value TH4, the selecting section 26 selects the less intense interblock filter b. Further, when the amount of coded data Bxy is equal to or greater than the threshold value TH4, the selecting section 26 selects the least intense interblock filter c.

Data representative of the interblock filter which has been selected by the interblock filter selecting section 26 as stated above is fed to the interblock distortion correcting section 20. As a result, the correcting section 20 executes the above-described processing by using the particular interblock filter, for thereby reducing the interblock distortion.

As described above, the illustrative embodiment selects a particular interblock filter which matches the amount of coded data Bxy and thereby achieves unprecedented advantages, as follows. When a block of interest has many low-frequency components and represents a relatively monotonous portion of a picture, a filter having a high filtering intensity is used to effectively remove a distortion appearing on the contour of the block. On the other hand, for a block having many high-frequency components and representative of a portion of a picture where a noticeable change occurs, use is made of a filter having a low filtering intensity since the distortion on the contour of such a block is not conspicuous, thereby reducing blur ascribable to the interblock filter processing.

The interblock filter selecting section 26 has been shown and described as selecting a particular interblock filter by comparing the amount of coded data Bxy with the threshold values TH3 and TH4 on a block basis. If desired, the block-by-block value Bxy may be replaced with a difference of a block of interest from the next block, i.e., $|Bx, y-Bx+1, y|$ or $|Bx, y-Bx, y+1|$. Specifically, to execute interblock filter processing with two horizontally adjoining blocks, a difference $|Bx, y-Bx+1, y|$ between the blocks is compared with the threshold values TH3 and TH4 to select a particular interblock filter matching the result of comparison. Namely, the filter a is selected if the difference $|Bx, y-Bx+1, y|$ is smaller than the threshold value TH3, the filter b is selected if the difference is equal to or greater than the threshold value TH3 and smaller than the threshold value TH4, or the filter c is selected if the difference is equal to or greater than the threshold value TH4. More specifically, when the difference $|Bx, y-Bx+1, y|$ between two nearby blocks is small, the distortion at the border between the blocks is conspicuous since such blocks differ little regarding the amount of low-frequency components and that of high-frequency components. Then, an intense filter is used to remove the interblock distortion. Conversely, when the difference $|Bx, y-Bx+1, y|$ is great, the above-mentioned distortion is not conspicuous since such blocks greatly differ from each other as to the amount of low-frequency components and that of high-frequency components. In such a case, a less intense filter is used to substantially free a reproduced pictue from blur. Regarding vertically adjoining two blocks, a difference $|Bx, y-Bx, y+1|$ between them is compared with the threshold values TH3 and TH4, and a particular interblock filter matching the result of comparison is selected in the above-described manner.

Figure 6:
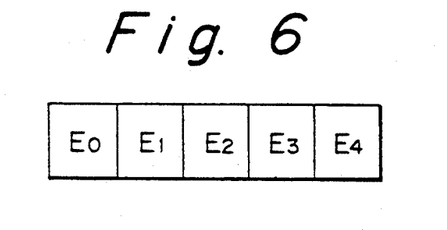
FIG. 6 shows an edge filter applicable to the first embodiment.

The edge enhancement constant selecting section 28 selects a particular constant of an edge filter to be used by the edge enhancing section 22 in response to the amount of block-by-block coded data Bxy which is fed from the data code counting section 30. As shown in FIG. 6, in the illustrative embodiment, the edge filter is implemented as a high pass filter which receives five pixel data at a time and processes them by using coefficients E0, E1, E2, E3 and E4 so as to pass high-frequency components. For example, to process a pixel A35 shown in FIG. 8 by the edge filter, the edge enhancing section 22 produces an edge Edg by an equation:

$$Edg = E0 \cdot A15 + E1 \cdot A25 + E2 \cdot Z35 + E3 \cdot A45 + E4 \cdot A55.$$

Then, the edge enhancing section 22 replaces the pixel A35 with pixel data A35 which is determined by an equation:

$$A35 = A35 + Edg * (CONST).$$

In the above equation, (CONST) is a parameter representative of the degree of edge enhancement and selected by the edge enhancement constant selecting section 28. In this embodiment, the parameter or edge enhancement constant (CONST) is selected from "0.1", "0.5" and "0.75". By such a procedure using the edge filter, the edge enhancing section 22 accentuates the edges existing in the blocks and thereby eliminates blur caused by the interblock filter.

The edge enhancement constant selecting section 28 compares the amount of coded data Bxy with predetermined threshold values TH1 and TH2 (TH1>TH2) and, based on the result of comparison, selects a particular edge enhancing constant, as follows. When the amount of coded data Bxy is smaller than the threshold value TH1, the selecting section 28 selects the smallest constant "0.1". Specifically, when the amount of data is small and, therefore, the block of interest has many high-frequency components, the degree of edge enhancement is reduced since such a block does not suffer from much blur despite the use of the interblock filter. When the amount of coded data Bxy is equal to or greater than the threshold value TH1 and smaller than the threshold value TH2, the selecting section 28 selects the medium constant "0.5". Further, when the amount Bxy is equal to or greater than the threshold value TH2, the selecting section 28 selects the greatest constant "0.75".

Receiving the constant so selected by the edge enhancement constant selecting section 28, the edge enhancing section 22 executes edge enhancement by using the constant and the edge filter.

As described above, the illustrative embodiment determines the amount of coded data on a block basis and selects a particular interblock filter matching the determined amount so as to reduce a distortion between nearby blocks. Stated another way, the embodiment selects a filter matching the frequency components existing in a block. When nearby blocks each has many low-frequency components, i.e., pixels which differ little from one another and the distortion between such blocks is conspicuous, an intense interblock filter is used to average pixel data existing at the border between such nearby blocks, which is successful in eliminating the distortion between the two blocks. Regarding blocks each having many high-frequency components, i.e., pixels which noticeably differ from one another, a less intense interblock filter is used since the interblock distortion is not noticeable, for thereby reducing the degree of edge removal processing. This prevents the high-frequency components, or picture data, existing in such blocks from being filtered out by an interblock filter.

When the amount of block-by-block coded data is replaced with a difference between nearby blocks as stated earlier, a particular filter matching a change in frequency components between the blocks is selected. This is also successful in executing the removal of interblock distortion in matching relation to the degree of distortion.

Further, the embodiment effects edge enhancement by changing the edge enhancing constant of an edge filter on the basis of the amount of block-by-block coded data. Specifically, when the block of interest contains many low-frequency components and, therefore, does not suffer from much blur ascribable to an interblock filter, the degree of edge enhancement is reduced. Regarding a block containing many high-frequency components, the edge enhancement is intensified since such a block is noticeably blurred by an interblock filter.

Figure 9:
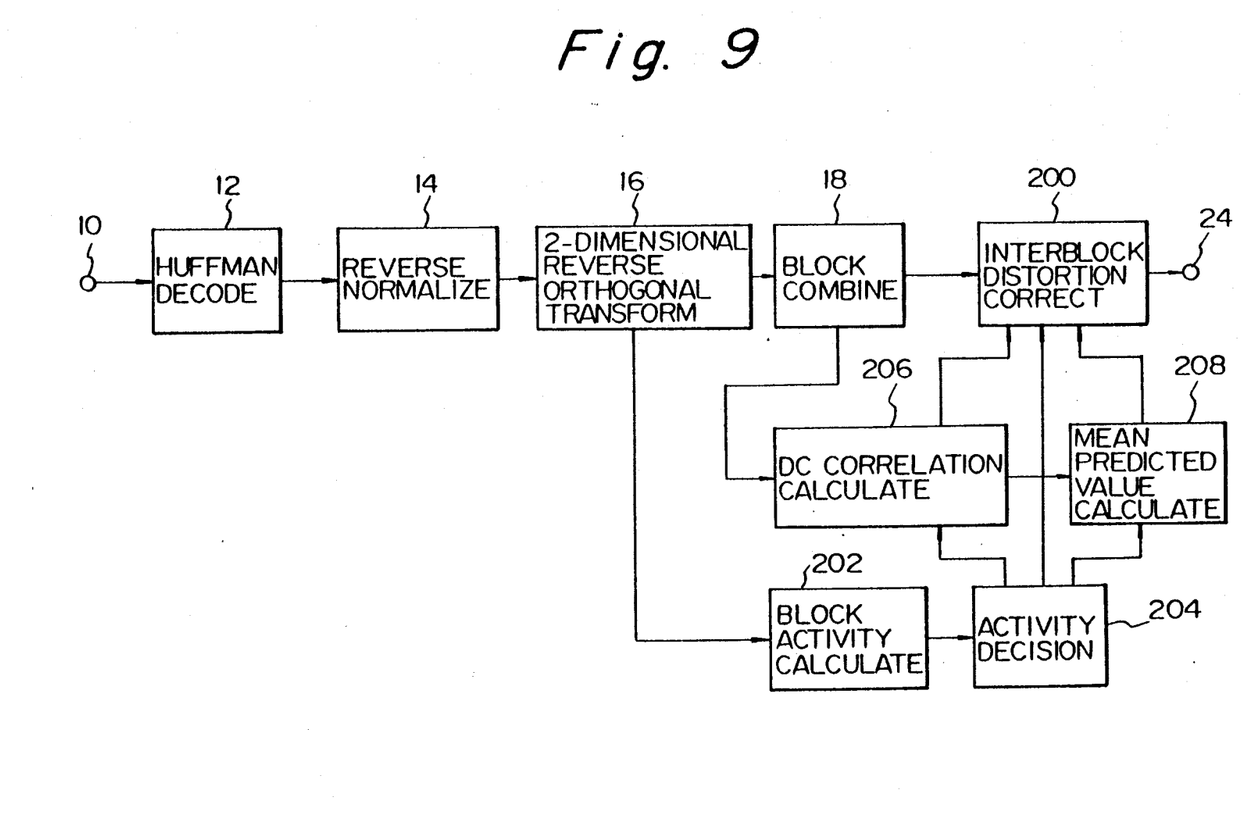
FIG. 9 is a schematic block diagram showing an alternative embodiment of the present invention.

Referring to FIG. 9, an alternative embodiment of the present invention will be described. In the figure, the blocks functionally identical with the blocks shown in FIG. 1 are designated by the same reference numerals, and a redundant description of the functionally identical blocks will be avoided for simplicity. Briefly, this embodiment differs from the previous embodiment in that it does not use filters in correcting interblock distortions, i.e., it calculates predicted values based on the DC components of each block and then replaces pixel data with the predicted values.

Specifically, as shown in FIG. 9, the picture data or blocks combined by the combining section 18 are applied to an interblock distortion correcting section 200. When the activity of a given block is lower than a predetermined value, the correcting section 200 corrects pixel data adjoining the border between nearby blocks by using DC correlation values and thereby corrects an interblock distortion, i.e., removes a contour otherwise appearing at the border.

The picture data processed by the two-dimensional reverse orthogonal transform section 16 are fed to a block activity calculating section 202. The block activity calculating section 202 determines the activity, i.e., the amount of high frequency components of each block on the basis of the block-by-block picture data which has undergone reverse orthogonal transform. The output of the block activity calculating section 202 is delivered to a decision section 204. In response, the decision section 204 compares the calculated block activity with a predetermined threshold value Th and delivers the result of comparison to a DC correlation calculating section 206.

The block activity calculating section 202 is omissible if the coded picture data coming in through the input terminal 10 are counted to determine the activity of each block, as in the previous embodiment. Specifically, as in the preceding embodiment, a data counter may be connected to the input terminal 10 to count coded data while feeding the output thereof to the decision section 204.

The image data from the combining section 18 is fed to the DC correlation calculating section 206. Assume that the decision section 204 has determined that the activity of a given block is lower than the threshold value Th. Then, the DC correlation calculating section 206 calculates DC correlation values for pixel data located at the boundary of the block of interest in order to correct the values of such pixel data.

Figure 10:
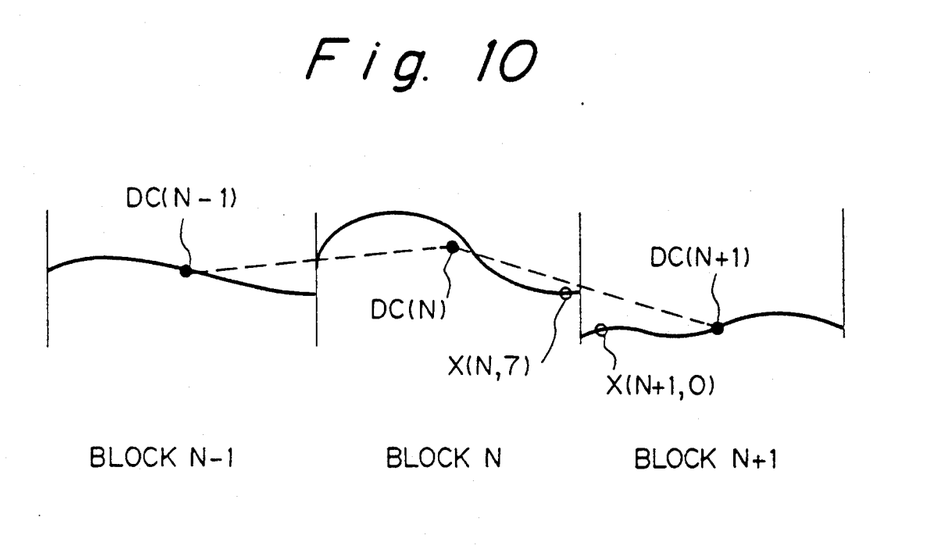
FIG. 10 is a diagram representative of pixel data located at the border between nearby blocks and processed by the alternative embodiment.

Specifically, FIG. 10, shows a block N and blocks N−1 and N+1 which neighbor the block N in the horizontal direction. The blocks N−1, N and N+1 each has a 8×8 pixel matrix, i.e., an array of eight pixel data in the horizontal direction. As shown in FIG. 10, the pixels X(N+1, 0) and X(N+1, 0) located at the boundary between the nearby blocks N and N+1 are noticeably different in level from each other. Such a difference in level at the border between nearby blocks is the cause of interblock distortion, i.e., the contour of a block appearing in a reproduced picture.

In the illustrative embodiment, the DC correlation calculating section 206 calculates DC correlation values to reduce the difference in level between pixels adjoining each other at the border between nearby blocks, e.g. the pixels X(N, 7) and X(N+1, 0). Regarding the pixels X(N, 7) and X(N+1, 0), the calculating section 206 produces DC correlation values e(N, 7) and e(N+1, 0), as follows:

$$e(N,7) = \{3 \times DC(N+1) + 5 + DC(N)\}/8 \text{ and}$$

$$e(N+1,0) = \{5 \times DC(N+1) + 3 \times DC(N)\}/8.$$

In the equations, DC(N+1) is the DC component value of the block N+1, i.e., the mean value of the levels of pixel data existing in the block N+1, while DC(N) is the DC component value of the block N, i.e., the mean value of the levels of pixel data existing in the block N. Hence, the DC component values DC(N) and DC(N+1) of the blocks N and N+1, respectively, are assumed to be positioned at the center of the associated blocks N and N+1. Since the pixel X(N, 7) is spaced apart from the DC component values DC(N) and DC(N+1) by, respectively, three pixels and five pixels, the DC correlation value e(N, 7) is determined by the above equation and thereby predicted as a point on the line interconnecting the values DC(N) and DC(N+1). Likewise, since the pixel X(N+1, 0) is spaced apart from the values DC(N) and DC(N+1) by, respectively, five pixels and three pixels, the DC correlation value e(N+1, 0) is produced by the above equation and predicted as a point on the line interconnecting the values DC(N) and DC(N+1).

The DC correlation values e(N, 7) and e(N+1, 0) determined by the calculating section 206 are transferred to an interblock distortion correcting section 200. In response, the interblock distortion correcting section 200 substitutes the DC correlation values e(N, 7) and e(N+1, 0) for the pixels X(N, 7) and X(N+1, 0), respectively. As a result, the distortion between the blocks N and N+1 is corrected to prevent a contour between the nearby blocks from appearing in a reproduced picture.

The DC correlation values e(N, 7) and e(N+1, 0) from the calculating section 206 are also fed to a mean predicted value calculating section 208 together with the output of the decision section 24. Assume that the output of the decision section 204 indicates that the activity of a block of interest is low, but it is not so low as to need the above-stated correction using the DC correlation value e(N, 7) or e(N+1, 0). Then, the mean predicted value calculating section 208 calculates mean predicted values X'(N, 7) and X'(N+1, 0), as follows:

$$X'(N,7)=\{X(N,7)+e(N,7)\}/2 \text{ and}$$

$$X'(N+1,0)=\{X(N+1,0)+e(N+1,0)\}/2.$$

Specifically, the calculating section 208 determines a mean predicted value X'(N, 7) by averaging the pixel data X (N, 7) and DC correlation value e(N, 7). Likewise, the calculating section 208 determines a mean predicted value X'(N+1, 0) by averaging the pixel data X (N+1, 0) and DC correlation value e (N+1, 0).

The mean predicted values X'(N, 7) and X'(N+1, 0) are delivered from the calculating section 208 to the interblock distortion correcting section 200. Then, the correcting section 200 substitutes the mean predicted values X'(N, 7) and X'(N+1, 0) for the pixels X (N, 7) and X (N+1, 0) to thereby correct an interblock distortion.

When the output of the decision section 204 indicates that the activity of a block of interest is high, the interblock distortion correcting section 200 does not perform the above operation which uses DC correlation values or mean predicted values. Instead, the correcting section 200 directly outputs the pixel data X (N, 7) and X (N+1, 0) fed thereto from the combining section 18. The output of the correcting section 200 appears on the output terminal 24.

Figure 11:
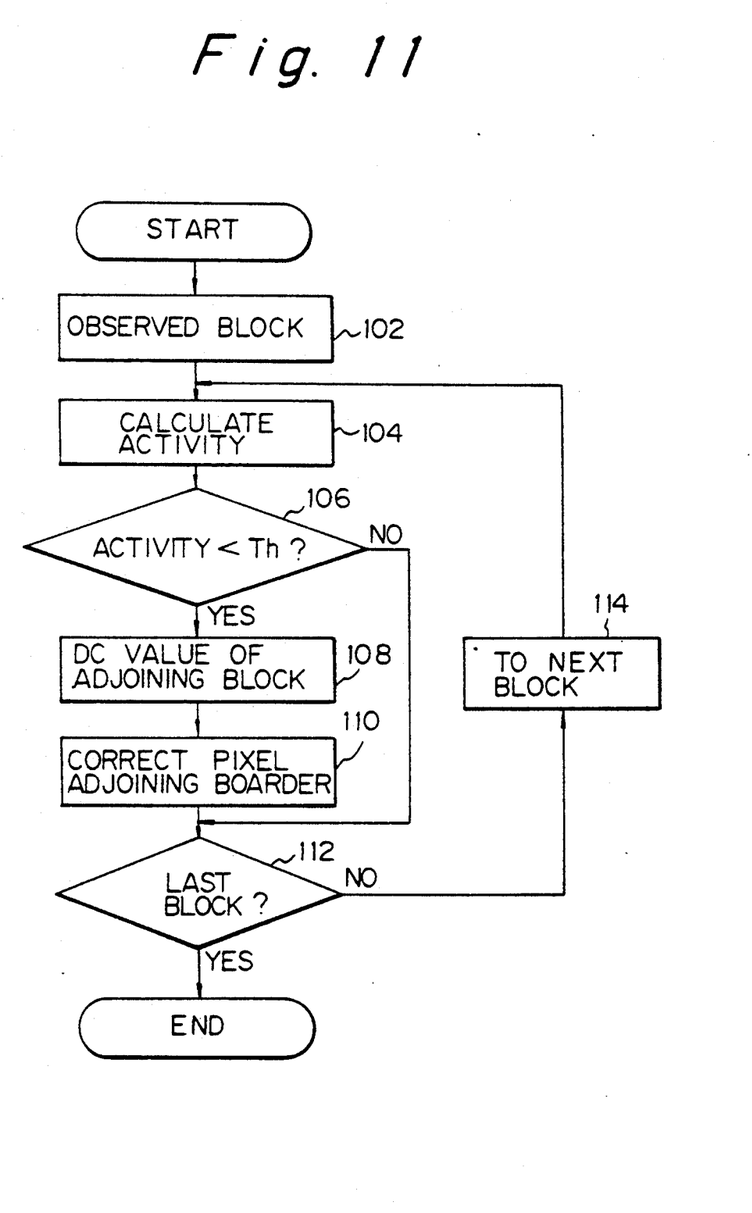
FIG. 11 is a flowchart demonstrating a specific operation of the alternative embodiment.

FIG. 11 shows a specific interblock distortion correcting procedure available with the illustrative embodiment. As shown, a given block is observed (step 102), and the activity of the observed block is determined by the block activity calculating section 202 (step 104). The decision section 204 compares the calculated block activity with the threshold value Th to see if the former is smaller than the latter (step 106). If the calculated activity is smaller than the threshold value (YES, step 106), the DC correlation calculating section 206 calculates the DC component value of the block of interest and the DC component value of the next block (step 108). The interblock distortion correcting section 200 corrects the pixels located at the border between the nearby blocks on the basis of the two DC component values (step 110). More specifically, the correcting section 200 substitutes the DC correlation values e(N, 7) and e(N+1, 0) or the mean predicted values X'(N, 7) and X'(N+1, 0) for the nearby pixels located at the border between the nearby blocks. As a result, the level difference at the border between the nearby blocks is reduced to eliminate the interblock distortion. Subsequently, the correcting section 200 determines whether or not the block which it has processed is the last block (step 112). If the processed block is the last block (YES, step 112), the program ends. If the processed block is not the last block (NO, step 112), the correcting section 200 performs the same processing with the next block (step 114). When the activity of the block of interest is not smaller than the threshold Th (NO, step 106), the operation is directly transferred to the step 112 without executing the above processing.

As described above, the illustrative embodiment uses the DC correlation values e(N, 7) and e(N+1, 0) when the block activity is extremely low or uses the mean predicted values X'(N, 7) and X'(N+1, 0) when it is somewhat low, for thereby correcting an interblock distortion. When the block activity is high, the embodiment does not execute such a distortion correcting operation at all. Hence, a picture having the distortions of the contours of blocks which are noticeable due to low block activities is corrected. However, picture having the distortions which are not noticeable due to high block activities is not corrected. It follows that a picture with high block activities appears clear-cut when reproduced since the picture does not undergo the distortion correction.

Regarding a picture having low block activities, interblock distortions are corrected by the use of DC correlation values or mean predicted values matching the activities. Specifically, DC correlation values are used to process a picture having extremely low block activities so as to sufficiently remove interblock distortions thereof, while mean predicted values are used to process a picture whose block activities are low in order to preserve sharpness.

In the above embodiment, DC correlation values or mean predicted values are applied only to blocks having low activities. Alternatively, consideration may also be given to the activity of a block next to the block of interest. For example, when a given block has a high activity while a block next to such a block has a low activity, the correction procedure described above may be executed only to a limited degree with the block of interest. Should the correction be effected with only one of nearby the blocks, the border between the blocks might appear somewhat discontinuous.

While the embodiment has been shown and described as determining the activity block by block with the block activity calculating section 206, it may be modified to determine a difference in activity between nearby blocks and execute the correction procedure by the use of DC correlated values or mean predicted values which match the determined difference.

If desired, after the correction procedure particular to the interblock distortion correcting section 100, an edge enhancing procedure using an edge filter may be executed, as in the previous embodiment.

Figure 12:
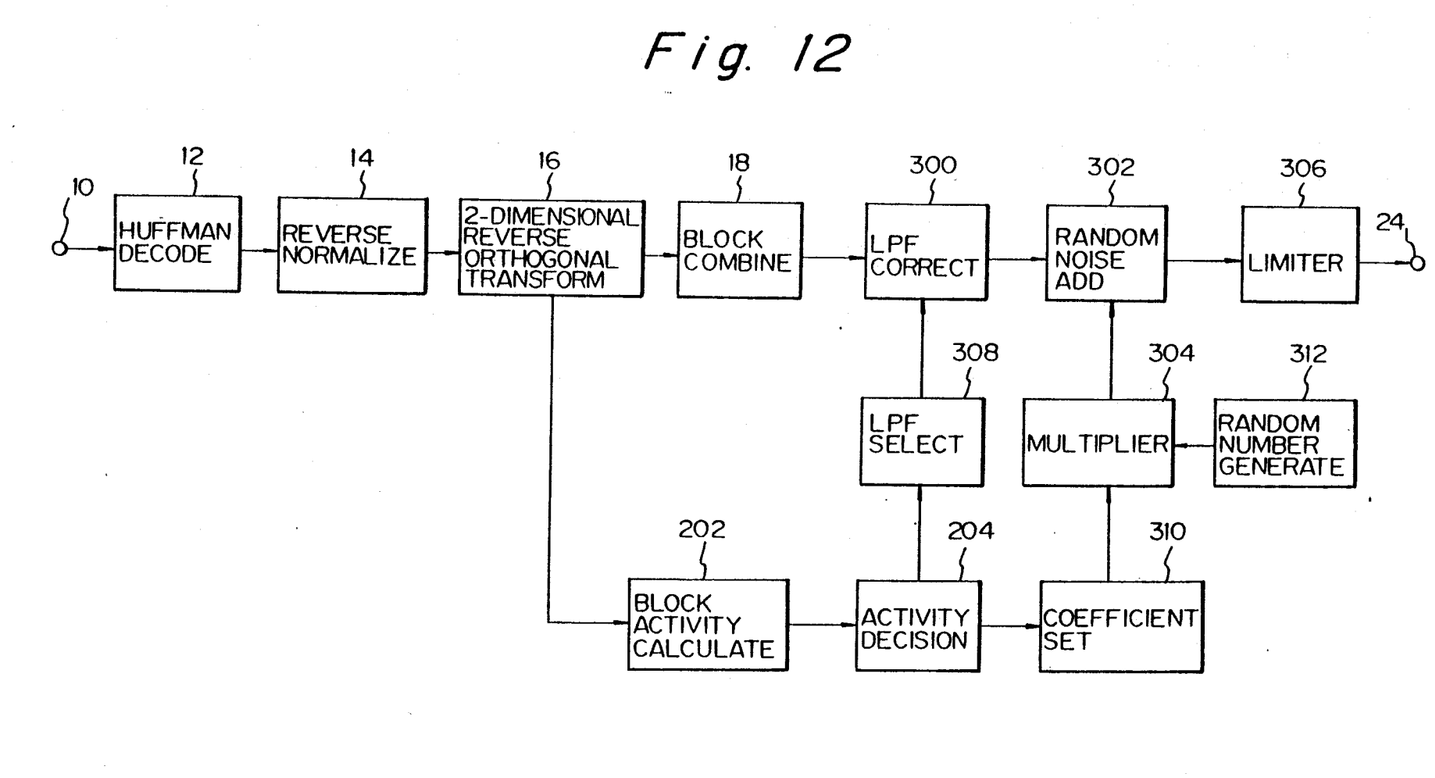
FIG. 12 is a block diagram schematically showing another alternative embodiment of the present invention.

Referring to FIG. 12, another alternative embodiment of the present invention will be desribed. In the figure, the blocks functionally equivalent to the blocks of the previous embodiments are designated by the same reference numerals, and a redundant description of the functionally equivalent blocks will be avoided for simplicity. Briefly, this embodiment adds, after the correction of an interblock distortion, random noise to pixel data in matching relation to the block activities of the individual blocks to thereby eliminate the distortions of the contours of the blocks.

As shown in FIG. 12, picture data combined by the combining section 18 are applied to a low pass filter (LPF) correcting section 300. When the activity of a given block is lower than a predetermined value, the LPF correcting section 300 corrects picture data adjoining the boundary of the block by using an LPR to eliminate an interblock distortion, i.e., to remove a contour otherwise appearing at the border between nearby blocks, as will be described more specifically later. The output of the LPF correcting section 300 is transferred to a random noise adding section 302 which is implemented by an adder. In response, the random noise adding section 302 adds random noise fed thereto from a multiplier 304 to the pixel data on the basis of the activity, as will also be described more specifically later. The output of the random noise adding section 302 is applied to a limiting section or limiter 306. The limiter 306 clips the pixel data provided with random noise by using a predetermined threshold value. Specifically, when the level of the pixel data exceeds a predetermined range, e.g., 0 to 255 due to the added random noise, the limiter 306 cuts the excessive part of the pixel data so that the latter may be confined in the particular range. The output of the limiter 306 is fed out via the output terminal 24.

Picture data transformed by the two-dimensional reverse orthogonal transform section 16 are fed to the block activity calculating section 202. The block activity calculating section 202 determines the block-by-block activities of the picture data, i.e., the amount of high-frequency components included in each block. The output of the calculating section 202 is transferred to the decision section 204. Again, the calculating section 202 is omissible if the coded data coming in through the input terminal 10 are counted to determine the block-by-block activities.

The decision section 204 compares the activity of each block determined by the block activity calculating section 202 with the predetermined threshold value Th to thereby determine whether the block activity is high or low. The result of the comparison is fed from the decision section 204 to an LPF selecting section 308 and a coefficient setting section 310.

Figure 13:
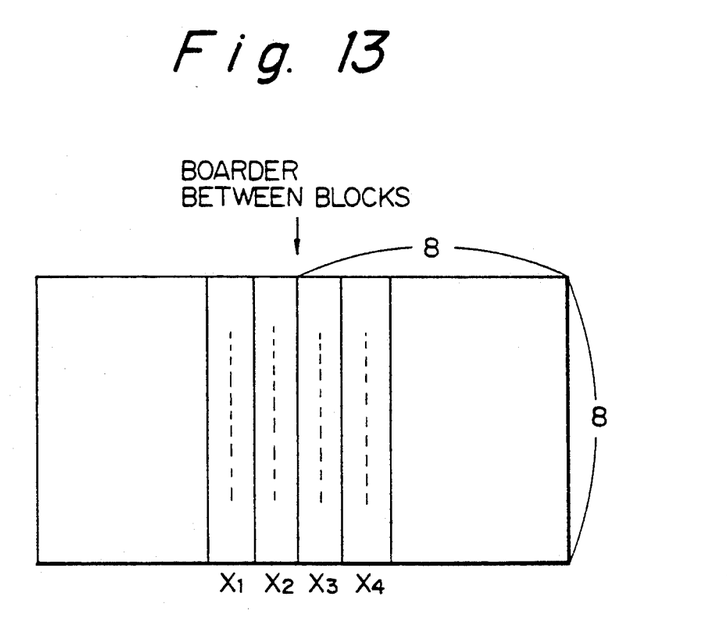
FIG. 13 shows specific levels of pixel data of nearby blocks to be processed by the embodiment of FIG. 12.

The LPF selecting section 308 selects a particular LPF which is to be used by the LPF correcting section 300 and matches the above-mentioned result of the comparison, i.e., whether the block activity is higher or lower than the threshold value Th. As shown in FIG. 13, the LPF to be used by the LPF correcting section 300 may filter four pixels X1, X2, X3 and X4 adjoining the vertically extending border between two nearby blocks, i.e., two pixels X1 and X2 of one block and two pixels X3 and X4 of the next block at a time. Then, the pixels X2 and X3 are replaced with particular values produced by:

$$X2 = K1 \cdot X1 + K2 \cdot X2 + K3 \cdot X3 + K4 \cdot X4 \qquad \text{Eq. (1)}$$

and $$X3 = K1 \cdot X4 + K2 \cdot X3 + K3 \cdot X2 + K4 \cdot X1 \qquad \text{Eq. (2)}$$

where K1 to K4 are coefficients which will be described below

When the activity of a block of interest is lower than the threshold value Th as determined by the decision section 204, the LPF selecting section 308 selects the coefficients K1 to K4 of the Eqs. (1) and (2), as follows:

$$K1 = 2/8, K2 = \tfrac{1}{2}, K3 = 2/8, K4 = \tfrac{1}{2}.$$

Such coefficients K1 to K4 allow the pixels X2 and X3 adjoining each other at the border between the blocks to be corrected by the nearby pixels, for thereby reducing a distortion appearing on the contour of the block.

Conversely, when the activity of a given block is higher than the threshold value Th, the following coefficients K1 to K4 are selected:

$$K1 = 0, K2 = 1, K3 = 0, K4 = 0.$$

In this case, the pixels X2 and X3 at the border between the blocks are not corrected at all.

The coefficient setting section 310 and a random number generating section 312 are connected to the multiplier 304. In the illustrative embodiment, the random number generating section 312 generates a random number out of $\pm 2$, $\pm 1$ and 0. The random number is used as random noise. The coefficient setting section 310 selects a coefficient $\beta$ which is 2 or 0, depending on whether or not the block activity is lower than the threshold value Th. The coefficient $\beta$ selected by this section 310 is fed to the multiplier 304. Assuming that 2 is selected as the coefficient $\beta$, then the multiplier 304 multiplies the random number outputted by the random number generating section 312 by 2 and delivers the product to the random noise adding section 302. In response, the random noise adding section 302 adds the multiplied random number or random noise to the pixel data fed thereto from the LPF correcting section 300. Such random noise serves to reduce a distortion ascribable to a contour which appears at the border between nearby blocks.

Figure 14:
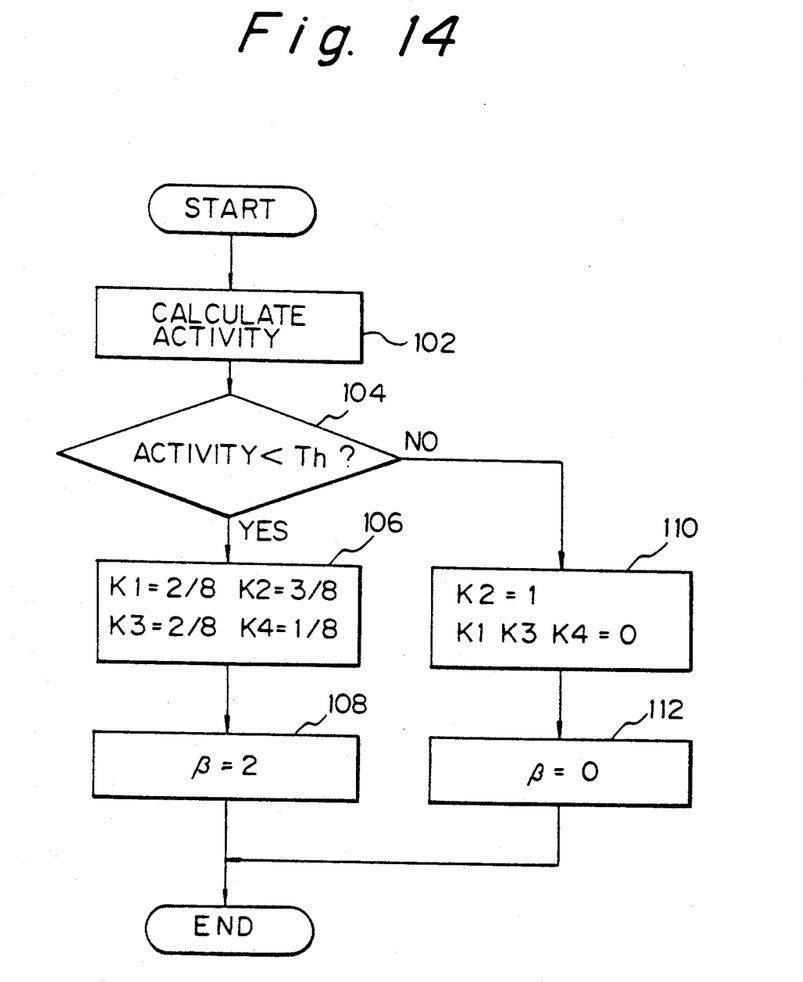
FIG. 14 is a flowchart demonstrating a specific operation of the embodiment of FIG. 12.

A reference will be made to FIG. 14 for describing a specific operation of this embodiment. Picture data sequentially routed through the Huffman decoding section 12, the reverse normalizing section 14 and the reverse orthogonal transform section 16 are applied to the block activity calculating section 202. The block activity calculating section 202 observes a particular block and determines the activity of that block (step 102). The decision section 204 compares the determined block activity with the threshold value Th to see if the former is smaller than the latter (step 104). The result of the comparison is fed from the decision section 204 to the LPF selecting section 308 and the coefficient setting section 310.

If the block activity is smaller than the threshold value Th, the LPF selecting section 308 selects coefficients K1, K2, K3 and K4 which are 2, 3, 2 and 1, respectively (step 106). The LPF correcting section 300 replaces the pixels X2 and X3 located at the border between the nearby pixels with particular values by using an LPF having the above coefficients and the Eqs. (1) and (2). The picture data produced by the LPF correcting section 300 is transferred to the random noise adding section 302.

When the activity of the block of interest is smaller than the threshold value Th, the coefficient setting section 310 selects 2 as the coefficient $\beta$ (step 108) and feeds it to the multiplier 304. The multiplier 304 multiplies a random number outputted by the random number generating section 312 by 2 and delivers the product to the random noise adding section 302. The random noise adding section 302 adds the output data of the multiplier 304, i.e., the random number multiplied by 2 to the picture data fed thereto from the LPF correcting section 300. The picture data with the random noise is transferred to the limiter 306.

The limiter 306 confines the level of the input picture data in the range of 0 to 255 by clipping the excessive part of the picture data. Specifically, all the picture data decoded and then combined by the combining section 18 have levels lying in the range of 0 to 255. Therefore, the picture data outputted by the LPF correcting section 300 also have values lying in the range of 0 to 255. However, the picture data to which random noise has been added by the random noise adding section 302 may exceed the range of 0 to 255. In such a case, the limiter 306 cuts the excessive part of the picture data.

If the block activity is not smaller than the threshold value Th as determined in the step 104, the LPF selecting section 308 selects coefficients K1, K2, K3 and K4 which are 0, 1, 0 and 0, respectively (step 110). The LPF correcting section 300 processes the pixels X2 and X3 by using an LPF having the above coefficients K1 to K4 and the Eqs. (1) and (2). As a result, the pixels X2 and X3 are outputted without being corrected. On the other hand, the coefficient setting circuit 310 sets the coefficient $\beta$ which is 0 (step 112) and feeds it to the multiplier 304. Then, the multiplier 304 multiplies a random number from the random number generating section 312 by 0. The resulted of the multiplication is applied to the random noise adding section 302, i.e., the random number is not applied to the adding section 302. The random noise adding section 302, therefore, does not add random noise to the pixel data fed thereto from the LPF correcting section 300. As a result, the limiter 306 does not clip the picture data.

As described above, when the activity of a block of interest is low, the embodiment corrects pixels located at the border between nearby blocks by the use of an LPF and adds random noise to the resultant pixel data. Hence, when the contours of individual blocks constituting a picture are noticeably distorted due to low block activities, the LPF and random noise successfully remove such distortions. On the other hand, when the block activities are high and, therefore, the distortions are not conspicuous, neither the correction of pixels by an LPF nor the addition of random noise is effected to preserve sharpness.

In the illustrative embodiment, the block activity calculating section 202 calculates the activity block by block. Alternatively, a difference in activity between nearby blocks may be determined so as to effect the above-described correction on the basis of the activity difference. Specifically, an arrangement may be made such that the correction using an LPF and random noise is executed when nearby blocks differ little with respect to the amounts of high-frequency and low-frequency components and, therefore, cause conspicuous distortions to appear at the border. Then, the correction will not be executed when the difference between nearby blocks is substantial.

The correction by the LPF correcting section 300 may be omitted so as to effect only the addition of random noise by the random noise adding section 302, if desired.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A device for regenerating a picture signal by decoding said picture signal, comprising:

decoding means for decoding digital picture data coded by compression;

reverse normalizing means for reversely normalizing picture data decoded by said decoding means;

reverse orthogonal transforming means for executing two-dimensional reverse orthogonal transform with picture data outputted by said reverse normalizing means;

data counting means for counting coded data existing in a plurality of blocks constituting the digital picture data block by block;

filter selecting means for selecting an interblock filter and an edge filter based on an amount of coded data determined by said data counting means block by block by comparing said amount of coded data of a given block with a predetermined threshold value;

correction means for executing correction processing for correcting a distortion between nearby ones of said blocks by using said interblock filter selected by said filter selecting means; and edge enhancing means for executing edge enhancement processing by using said edge filter selected by said filter selecting means;

said filter selecting means selecting an intensity of said interblock filter and an intensity of said edge filter based on said amount of coded data determined block by block so that an intense interblock filter and a weak edge filter are selected if said amount of coded data of said given block is small.

2. A method for regenerating a picture signal by decoding the picture signal, comprising the steps of:

(a) decoding digital picture data coded by compression;

(b) reversely normalizing picture data decoded at said step (a);

(c) executing two-dimensional reverse orthogonal transform with picture data reversely normalized at said step (b);

(d) counting coded data existing in a plurality of blocks constituting digital picture data block by block;

(e) selecting an interblock filter and an edge filter based on an amount of coded data determined block by block by comparing said amount of coded data of a given block with a predetermined threshold value;

(f) executing correction processing for correcting a distortion between nearby ones of said blocks by using said interblock filter selected at said step (e);

(g) executing edge enhancement processing by using said edge filter selected at said step (e); and (h) selecting an intensity of said interblock filter and an intensity of said edge filter based on said amount of coded data determined block by block so that an intense interblock filter and a weak edge filter are selected if said amount of coded data of said given block is small.

3. A device for regenerating a picture signal by decoding said picture signal, comprising:

decoding means for decoding digital picture data coded by compression;

reverse normalizing means for reversely normalizing picture data decoded by said decoding means;

reverse orthogonal transforming means for executing two-dimensional reverse orthogonal transform with picture data outputted by said reverse normalizing means;

activity calculating means for calculating activities of a plurality of blocks constituting the digital picture data block by block;

predicted value calculating means for calculating predicted pixel data to be substituted for pixel data located at the boarder between nearby ones of said blocks; and distortion correcting means for executing correction processing for correcting a distortion between nearby ones of said blocks by using said predicted pixel data determined by said predicted value calculating means;

said distortion correcting means executing said correction processing based on said predicted pixel data in matching relation to the activity which is determined block by block.

4. A device in accordance with claim 3, wherein said distortion correcting means compares the activity of a given block with a predetermined threshold value and executes the correction processing only if said activity is smaller than said threshold value.

5. A device for regenerating a picture signal by decoding said picture signal, comprising:

decoding means for decoding digital picture data coded by compression;

reverse normalizing means for reversely normalizing picture data decoded by said decoding means;

reverse orthogonal transforming means for executing two-dimensional reverse orthogonal transform with picture data outputted by said reverse normalizing means;

activity calculating means for calculating activities of a plurality of blocks constituting the digital picture data block by block;

random noise generating means for generating random noise; and random noise adding means for adding said random noise generated by said random noise generating means to pixel data outputted by said reverse orthogonal transforming means;

said random noise adding means adding said random noise in matching relation to the activity determined block by block.

6. A device in accordance with claim 5, further comprising low pass filter correcting means for processing pixel data located at the border between nearby ones of said blocks by a low pass filter on the basis of the activity determined block by block;

said random noise adding means adding said random noise to said pixel data processed by said low pass filter correcting means.

7. A device in accordance with claim 5 or 6, wherein said random noise adding means compares the activity of a given block with a predetermined threshold value and adds said random noise only if said activity is smaller than said threshold value.

8. A method for regenerating a picture signal by decoding the picture signal, comprising the steps of:

(a) decoding digital picture data code by compression;

(b) reversely normalizing picture data decoded at said step (a);

(c) executing two-dimensional reverse orthogonal transform with picture data outputted at said step (b);

(d) calculating activities of a plurality of blocks constituting the digital picture data block by block;

(e) calculating predicted pixel data to be substituted for pixel data located at the border between nearby ones of said blocks;

(f) executing correction processing for correcting a distortion between nearby ones of said blocks by using said predicted pixel data determined at said step (e); and (g) executing said correction processing based on said predicted pixel data in matching relation to the activity which is determined block by block.

9. A method in accordance with claim 8, wherein said step (g) compares the activity of a given block with a predetermined threshold value and executes said correction processing only if said activity is smaller than said threshold value.

10. A method for regenerating a picture signal by decoding the picture signal, comprising the steps of:

(a) decoding digital picture data coded by compression;

(b) reversely normalizing picture data decoded at said step (a);

(c) executing two-dimensional reverse orthogonal transform with picture data outputted at said step (b);

(d) calculating activities of a plurality of blocks constituting the digital picture data block by block;

(e) generating random noise; and (f) adding said random noise generated at said step (e) to pixel data outputted at said step (c) in matching relation to the activity determined block by block.

11. A method in accordance with claim 10, further comprising the steps of:

(g) processing pixel data located at the border between nearby ones of said blocks by a low pass filter based on the activity determined block by block; and (h) adding said random noise to said pixel data processed at said step (g).

12. A method in accordance with claim 10, wherein said step (f) compares the activity of a given block with a predetermined threshold value and adds said random noise only if said activity is smaller than said threshold value.

* * * * *